(12) United States Patent
McPhillips

(10) Patent No.: US 11,085,183 B2
(45) Date of Patent: Aug. 10, 2021

(54) DISPLAY SYSTEM

(71) Applicant: Atomic Design, Inc., Lititz, PA (US)

(72) Inventor: Thomas McPhillips, Manheim, PA (US)

(73) Assignee: Atomic Design Inc., Lititz, PA (US)

(*) Notice: Subject to any disclaimer, the term of this patent is extended or adjusted under 35 U.S.C. 154(b) by 0 days.

(21) Appl. No.: 16/576,136

(22) Filed: Sep. 19, 2019

(65) Prior Publication Data

US 2020/0011052 A1 Jan. 9, 2020

Related U.S. Application Data

(63) Continuation of application No. 14/950,521, filed on Nov. 24, 2015, now Pat. No. 10,458,115, which is a
(Continued)

(51) Int. Cl.
*E04B 2/74* (2006.01)
*G09F 15/00* (2006.01)
(Continued)

(52) U.S. Cl.
CPC ............ *E04B 2/7405* (2013.01); *A47F 5/105* (2013.01); *A63F 1/02* (2013.01); *A63J 1/02* (2013.01);
(Continued)

(58) Field of Classification Search
CPC ................. E04B 2/7405; E04B 2/7416; E04B 2002/7479; E04B 2/7433;
(Continued)

(56) References Cited

U.S. PATENT DOCUMENTS 1,525,515 A 2/1925 Socha
2,241,338 A * 5/1941 Balduf .................... E04B 2/842
52/241
(Continued)

FOREIGN PATENT DOCUMENTS

AU 2012261483 A1 6/2013
CA 1263233 A1 11/1989
(Continued)

OTHER PUBLICATIONS

Installation Instructions for Pillow Wall, by Atomic, www.atomicrental.tv, (717-626-4408), dated Nov. 25, 2013, 1 page.
(Continued)

*Primary Examiner* — Ko H Chan
(74) *Attorney, Agent, or Firm* — Barley Snyder

(57) ABSTRACT

A building unit is provided and includes a plurality of modular display panels and a plurality of modular display panel connectors. The plurality of modular display panels is positioned adjacent to each other in a grid shape array and extending between a display support structure having a plurality of interconnecting poles. The plurality of modular display panel connectors not in contact with the display support structure and connecting the plurality of modular display panels from a rear planar surface side of the plurality of modular display panels. Each modular panel connector is positioned along the rear planar surface side of the plurality of modular display panels and includes a plurality of fasteners securing the plurality of modular display panels in the grid shape array.

20 Claims, 10 Drawing Sheets

Related U.S. Application Data continuation of application No. 13/739,617, filed on Jan. 11, 2013, now Pat. No. 9,254,051.

(51) Int. Cl.

| | | |
|---|---|---|
| *F16B 12/42* | (2006.01) | |
| *A63J 1/02* | (2006.01) | |
| *A47F 5/10* | (2006.01) | |
| *A63F 1/02* | (2006.01) | |
| *F16B 5/00* | (2006.01) | |
| *A47F 11/02* | (2006.01) | |

(52) U.S. Cl.
CPC .......... *E04B 2/7416* (2013.01); *F16B 5/0004* (2013.01); *F16B 12/42* (2013.01); *G09F 15/00* (2013.01); *G09F 15/0068* (2013.01); *A47F 11/02* (2013.01); *E04B 2/7433* (2013.01); *E04B 2002/7461* (2013.01); *E04B 2002/7479* (2013.01)

(58) Field of Classification Search
CPC ............ E04B 2002/7461; F16B 5/0004; F16B 12/42; A63F 1/02; A47F 5/105; A47F 11/02; A63J 1/02; G09F 15/00; G09F 15/0068; Y10T 403/556
See application file for complete search history.

(56) References Cited

U.S. PATENT DOCUMENTS

| | | | |
|---|---|---|---|
| 2,692,689 A | 10/1954 | Wynne, Sr. | |
| 2,947,680 A * | 8/1960 | Preiser | C23F 13/18 204/196.18 |
| 2,970,396 A | 2/1961 | Worrell | |
| 3,192,820 A | 7/1965 | Pitzer | |
| 3,415,554 A * | 12/1968 | Papayoti | E04G 7/24 403/187 |
| 3,426,913 A | 2/1969 | Abatiell, Jr. | |
| 3,537,199 A | 11/1970 | Lawson | |
| 3,571,999 A | 3/1971 | Downing | |
| 3,593,474 A * | 7/1971 | Neels | E04B 2/7433 52/223.7 |
| 3,596,701 A | 8/1971 | Cowan | |
| 3,854,259 A * | 12/1974 | Lechene | E04B 1/6112 52/704 |
| 3,936,111 A | 2/1976 | Mazzucconi | |
| 4,001,987 A | 1/1977 | Coulthard | |
| 4,114,160 A | 9/1978 | Verini | |
| 4,275,520 A * | 6/1981 | Appleton | G09F 15/0068 40/605 |
| 4,295,754 A * | 10/1981 | Ashton | F16B 7/048 403/369 |
| 4,406,105 A * | 9/1983 | Colvin | E04B 2/92 52/204.58 |
| 4,667,833 A * | 5/1987 | Jamison | G09F 15/0068 160/135 |
| 4,733,986 A * | 3/1988 | Kenning | E04B 1/5812 403/306 |
| 4,807,837 A | 2/1989 | Gawlik et al. | |
| D307,448 S | 4/1990 | Akard | |
| 5,036,641 A | 8/1991 | Viry | |
| 5,061,018 A | 10/1991 | Pederson et al. | |
| 5,344,115 A | 9/1994 | Mayne | |
| 5,478,041 A | 12/1995 | Mayne | |
| 5,590,921 A | 1/1997 | Holtman et al. | |
| 5,671,852 A | 9/1997 | Maharg | |
| 5,722,477 A | 3/1998 | Richter et al. | |
| 5,947,356 A * | 9/1999 | Delong | B60R 9/00 224/404 |
| 5,993,287 A | 11/1999 | Melashenko et al. | |
| 6,267,525 B1 * | 7/2001 | Wu | A47G 5/00 160/135 |
| 6,340,046 B1 | 1/2002 | Basseches | |
| 6,370,803 B1 | 4/2002 | Burquest | |
| 6,419,332 B1 | 7/2002 | Caldwell, Jr. et al. | |
| 6,702,640 B1 | 3/2004 | Park | |
| 6,718,709 B2 | 4/2004 | Koutras et al. | |
| 6,896,439 B2 * | 5/2005 | Gasparotto | E06B 3/5436 403/293 |
| 6,983,853 B1 | 1/2006 | Fickett | |
| D515,252 S | 2/2006 | Dumbrell | |
| D562,113 S | 2/2008 | Ciungan et al. | |
| D618,282 S | 6/2010 | Kosir | |
| D624,461 S | 9/2010 | Noble et al. | |
| 7,874,090 B2 | 1/2011 | Flagg | |
| D634,745 S | 3/2011 | Park et al. | |
| 8,069,632 B2 | 12/2011 | Li | |
| 8,083,189 B2 | 12/2011 | Sun et al. | |
| 8,100,378 B1 * | 1/2012 | Casini | E04B 5/38 249/18 |
| 8,162,268 B1 | 4/2012 | Huang | |
| D708,504 S | 7/2014 | Kaplan | |
| D709,203 S | 7/2014 | Shikata | |
| 9,004,145 B2 * | 4/2015 | Toledo | E04B 2/76 160/351 |
| D736,858 S | 8/2015 | McPhillips | |
| 2002/0036908 A1 | 3/2002 | Pederson | |
| 2002/0154789 A1 | 10/2002 | Rodgers | |
| 2003/0000904 A1 | 1/2003 | Lung et al. | |
| 2003/0192271 A1 | 10/2003 | Koutas et al. | |
| 2004/0035987 A1 | 2/2004 | Oddsen, Jr. | |
| 2004/0089782 A1 | 5/2004 | Eliason et al. | |
| 2005/0007031 A1 | 1/2005 | Hyder | |
| 2007/0107853 A1 | 5/2007 | Hsieh | |
| 2008/0029667 A1 * | 2/2008 | Schmitz | F16B 2/185 248/222.13 |
| 2009/0134285 A1 | 5/2009 | Huang | |
| 2009/0196034 A1 | 8/2009 | Gherardini et al. | |
| 2012/0169999 A1 | 7/2012 | Cavendish et al. | |
| 2014/0047747 A1 | 2/2014 | Jackson | |
| 2014/0183309 A1 | 7/2014 | Pasho | |
| 2014/0197123 A1 | 7/2014 | McPhillips | |

FOREIGN PATENT DOCUMENTS

| | | |
|---|---|---|
| DE | 8517546.3 U1 | 1/1985 |
| DE | 29820223 U1 | 2/1999 |
| DE | 10138986 A | 3/2003 |
| DE | 102011015351 A1 | 10/2012 |
| EP | 1995508 A2 | 11/2008 |
| FR | 2851442 A1 | 2/2003 |
| JP | S4970886 U | 6/1974 |
| JP | S5419690 U | 2/1979 |
| JP | 3148195 U | 2/2009 |

OTHER PUBLICATIONS

PCT Notification and International Preliminary Report on Patentability, Application No. PCT/US2014/011055, dated Jul. 14, 2015, 7 pages.
PCT Notification, International Search Report, International Application No. PCT/US2014/061074, dated Feb. 25, 2015, 12 pages.
PCT Notification, International Search Report and Written Opinion, International Application No. PCT/US2014/011055, dated Jun. 2, 2014, 10 pages.
PCT International Preliminary Report on Patentability, International Application No. PCT/US2014/061074, dated Apr. 19, 2016, 7 pages.
PCT Notification of Transmittal of International Preliminary Report on Patentability, International Application No. PCT/US2014/061074, dated Apr. 28, 2016, 1 page.
Attachment 1, Installation Instructions, Swell Latch Installation Instructions, Innovative Components, dated Jun. 16, 2009, 1 page.
European Office Action, dated Mar. 29, 2018, 4 pages.
Japanese Office Action and English translation of Japanese Office Action, dated Jul. 18, 2017, 8 pages.
Japanese Notification of Reasons for Refusal, with English translation, dated Aug. 7, 2018, 11 pages.
English translation of JPS4970886U, dated Jun. 20, 1974, 1 page.
English translation of JPS5419690U, dated Feb. 8, 1979, 1 page.

* cited by examiner

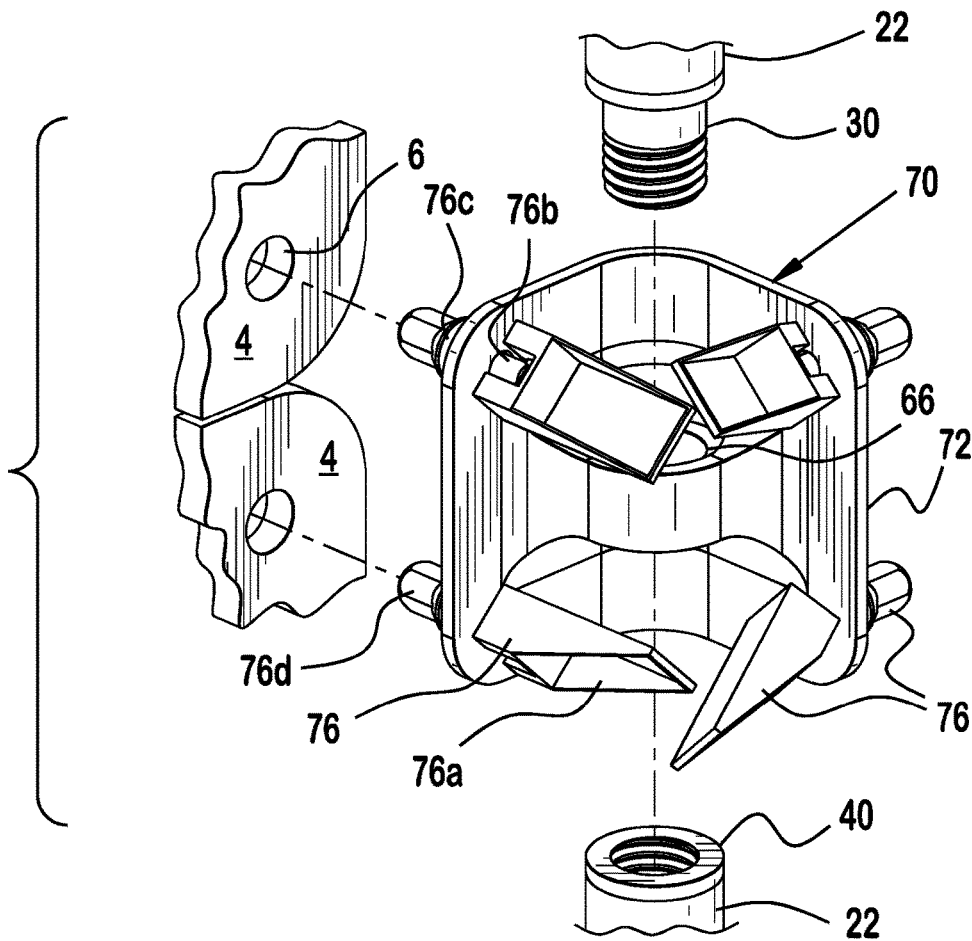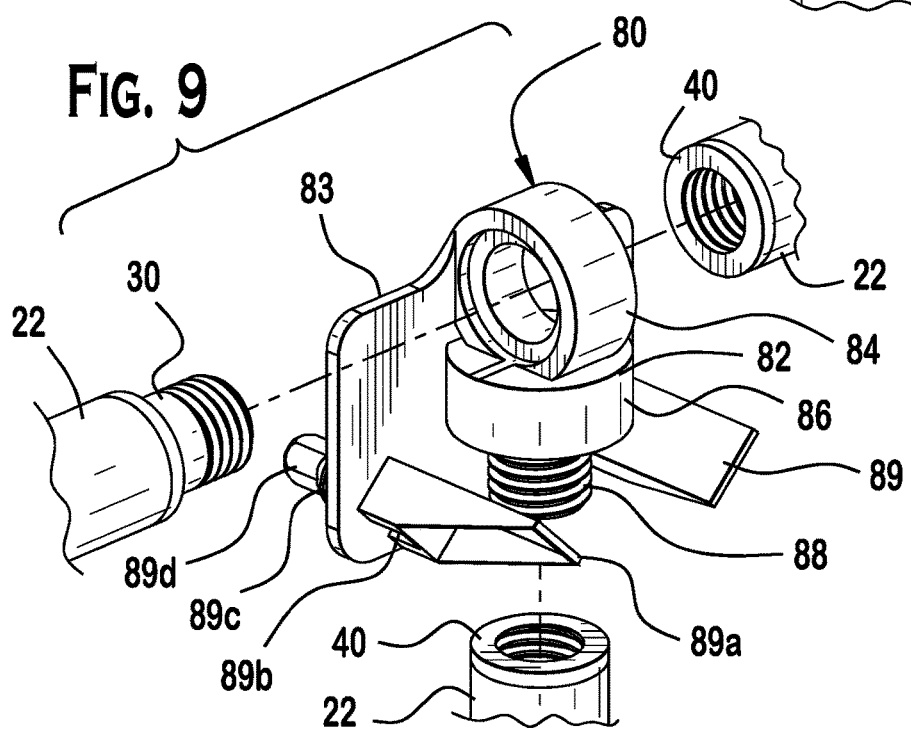

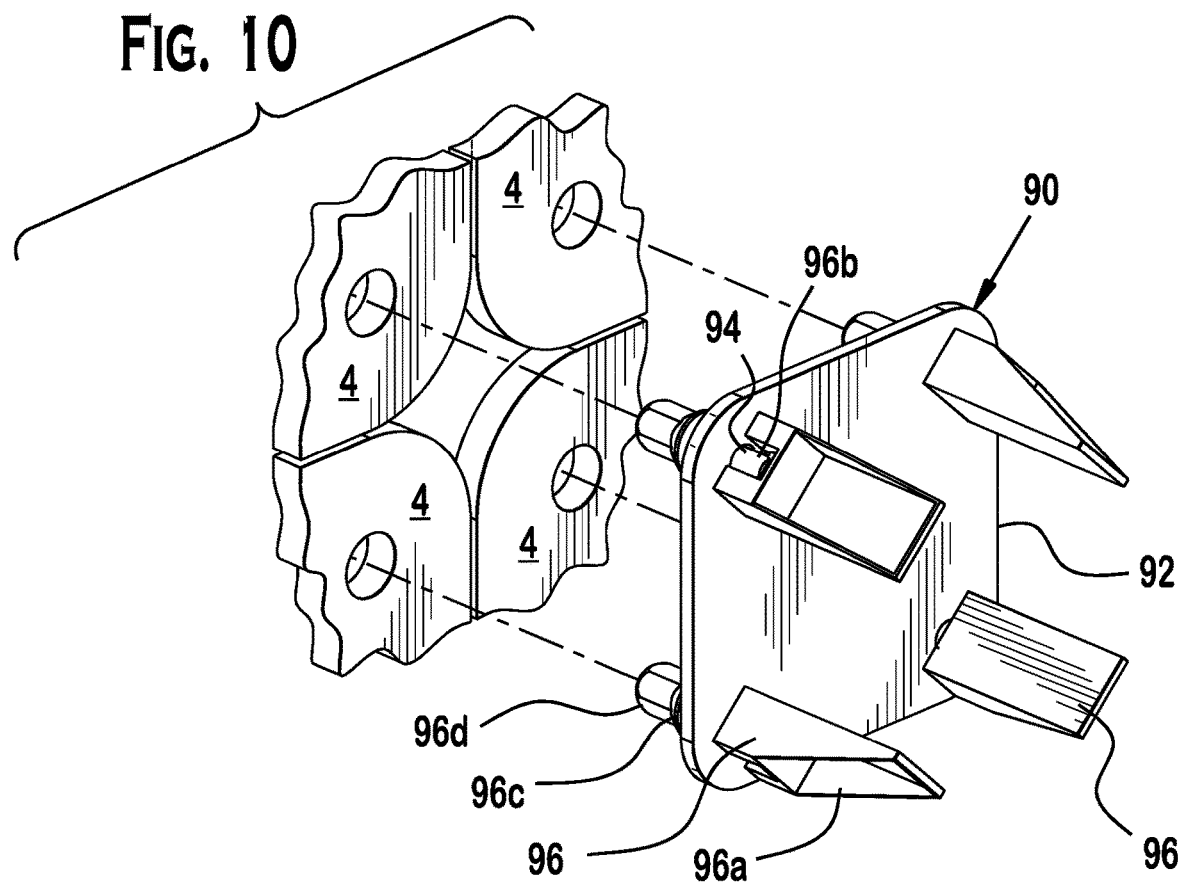
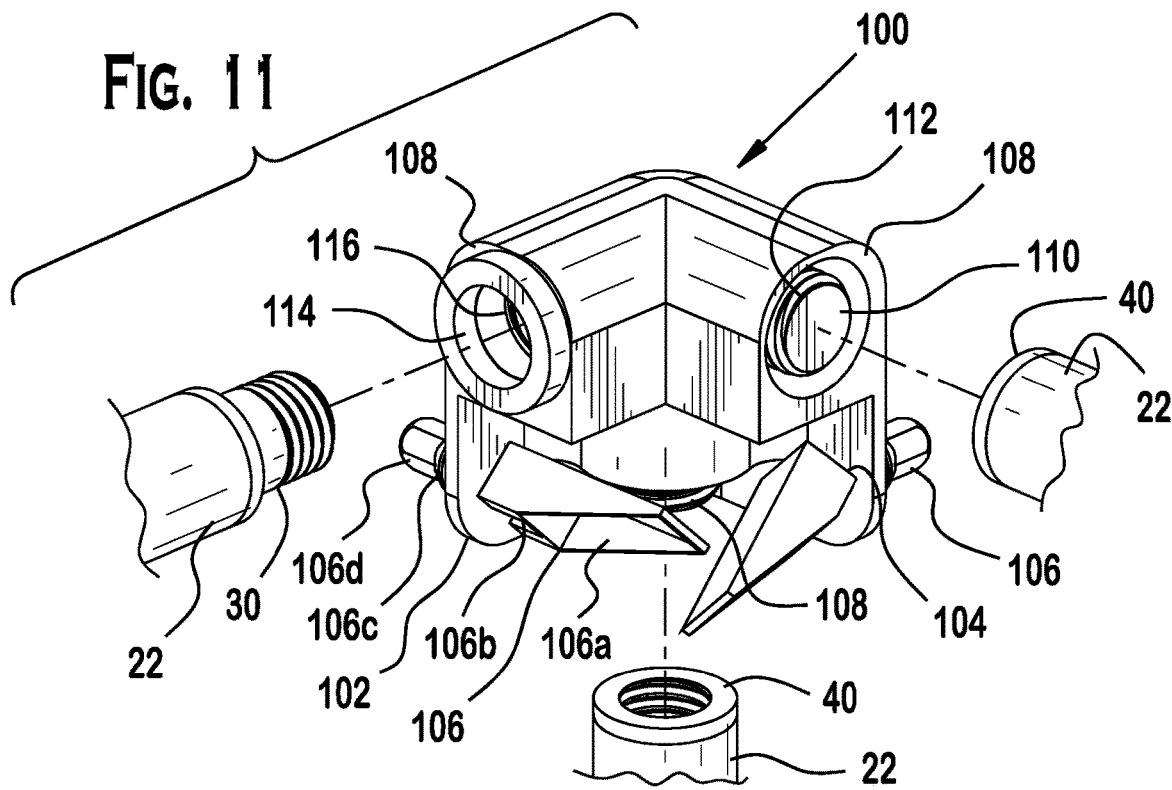

DISPLAY SYSTEM

CROSS-REFERENCE TO RELATED APPLICATIONS

This application is a continuation of U.S. patent application Ser. No. 14/950,521, filed Nov. 24, 2015, claiming priority under 35 U.S.C. § 119.

FIELD OF THE INVENTION

The invention relates to floor displays and, more particularly, to collapsible display systems for connecting a plurality of panels.

BACKGROUND

Decorative modular displays are commonly used in stage and set design. Generally, modular units are hung from a hanging frame using backdrop technology. A known modular display system uses a truss or theatre fly-system pipes to hang modular panels that clip together using rings or hooks to form a backdrop, which results is a decorative surface that is aesthetic while also increasing the range of available lighting effects. The backdrop is sized to fit the space required. In some circumstances, a floor system may be used instead of a truss and/or backdrop. In the known floor display system, a temporary structure is set up from the floor, rather than suspended from the ceiling. The known floor display system includes metal pipes or tubes that connect to each other and the modular units hang from these metal pipes or tubes. Additionally, when using these pipes in the known display system, connecting pipes are commonly over tightened and damaged, and the modular units attached to the pipes are restricted from free movement about the pipe.

Additionally, in both known display systems, the display systems are restricted from free movement of the display or individual modular units. Furthermore, these known display systems include complex attachment mechanisms to connect one modular unit to an adjacent modular unit. These known designs are expensive and require tedious labor in assembly. Additional problems with these known display systems involve connection between adjacent modular units and methods for controlling a gap between connecting adjacent modular units. Furthermore, each modular unit in the known display system is either permanently attached the adjacent modular unit or requires a complex rigid connection system, which restricts replacement of each modular unit and/or the entire system. It has been long desired to have a modular display system having a seamless backdrop that is more customizable.

SUMMARY

Therefore, the invention relates to a building unit is provided and includes a plurality of modular display panels and a plurality of modular display panel connectors. The plurality of modular display panels is positioned adjacent to each other in a grid shape array and extending between a display support structure having a plurality of interconnecting poles. The plurality of modular display panel connectors not in contact with the display support structure and connecting the plurality of modular display panels from a rear planar surface side of the plurality of modular display panels. Each modular panel connector is positioned along the rear planar surface side of the plurality of modular display panels and includes a plurality of fasteners securing the plurality of modular display panels in the grid shape array.

BRIEF DESCRIPTION OF THE DRAWINGS

The invention will be explained in greater detail in the following with reference to embodiments, referring to the appended drawings, in which:

FIG. 8 is a perspective view of another spinner connector according to the invention, shown connecting to the collapsible support structure along a corner;

FIG. 9 is perspective view of another spinner connector according to the invention, shown having a support connector;

FIG. 10 is perspective view of a supplemental connector according to the invention;

FIG. 11 is perspective view of a structure connector according to the invention;

DETAILED DESCRIPTION OF THE EMBODIMENT(S)

Embodiments of the invention will now be described in greater detail with reference to the drawings.

Figure 1:
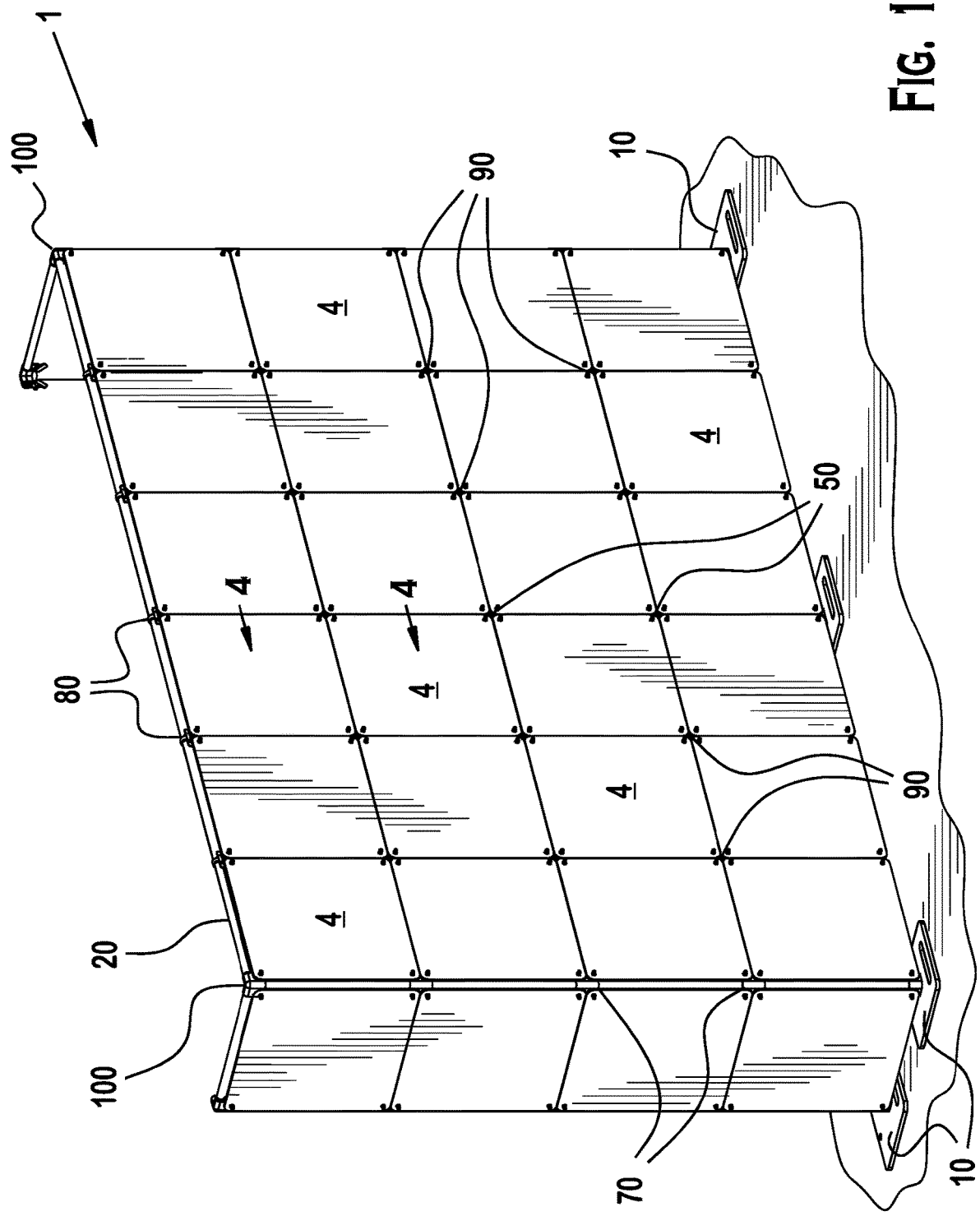
FIG. 1 is a front perspective view of a display system according to the invention.

Referring first to FIG. 1, a display system 1 according to an embodiment of the invention is shown and includes the following major components: a base 10, a collapsible support structure 20, a plurality of spinner connectors 50, and a plurality of modular panels 4.

As shown in FIG. 1, each modular panel 4 is a shaped article. The modular panel 4 in the shown embodiment includes a thin squared panel body and a plurality of fastener receiving passageways 6. The panel body is made from textured material, but could be prepared from a variety of display materials, such as fiberboard, paper, plastic, wood, metal or other material that fits requirements of a particular use. One skilled in the art would appreciate that the shape, size and texture of the modular panel 4 can be modified and designed for a particular use.

Figure 3:
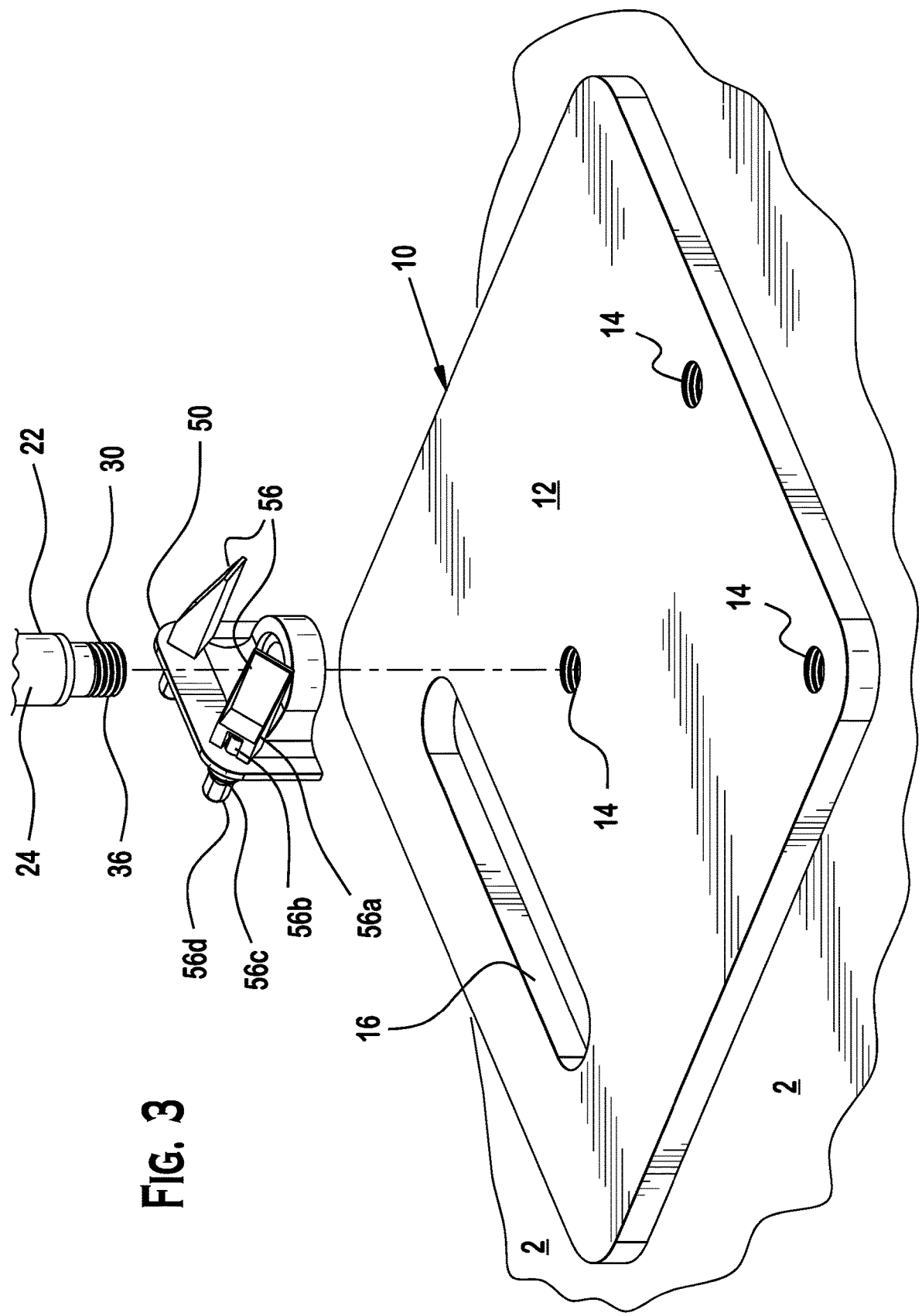
FIG. 3 is a close-up exploded perspective view of a base, a collapsible support system, and a spinner connector of the display system according to the invention.

Now with reference to FIG. 3, the base 10 includes a base body 12, a support connection section 14, and a grip 16. The base body 12 is a planar object made from a solid structural material, such as metal such as aluminum. However, one skilled in the art would appreciate that the base body 12 may be prepared from other structural materials such as fibrous material, plastic, or material composite, and include various polygonal shapes. Further, one skilled in the art would appreciate that the base body 12 may be hollow. The base body 12 should include a major planar surface that is a support surface.

Again, with reference to FIG. 3, the support connection section 14 is an opening or passageway extending through the base body 12. In fact, the support connection section 14 may extend completely through the base body 12, or may be a blind hole that only partial extends through the base body 12. The support connection section 14 includes a threaded portion disposed along an inner surface thereof.

In another embodiment, the support connection section 14 may be a protrusion (not shown), rather than an opening or passageway. In such an embodiment, the support connection section 14 extends upward from the base body 12 and corresponds to an end of the collapsible support structure 20.

As shown in FIG. 3, the grip 16 is an oval shaped opening positioned along a side of the base body 12. The grip 16 may be integral to the base 10 or a separate component that attaches to the base 10. For instance, in other embodiments, the grip 16 may be an abrasive material, a coating, or resistive pattern disposed along a surface of the base body 12, such as grooved patterns or sand paper material. Additionally, one skilled in the art would appreciate that connecting articles may be used, including a handle, a knob, or other gripping members.

Figure 2:
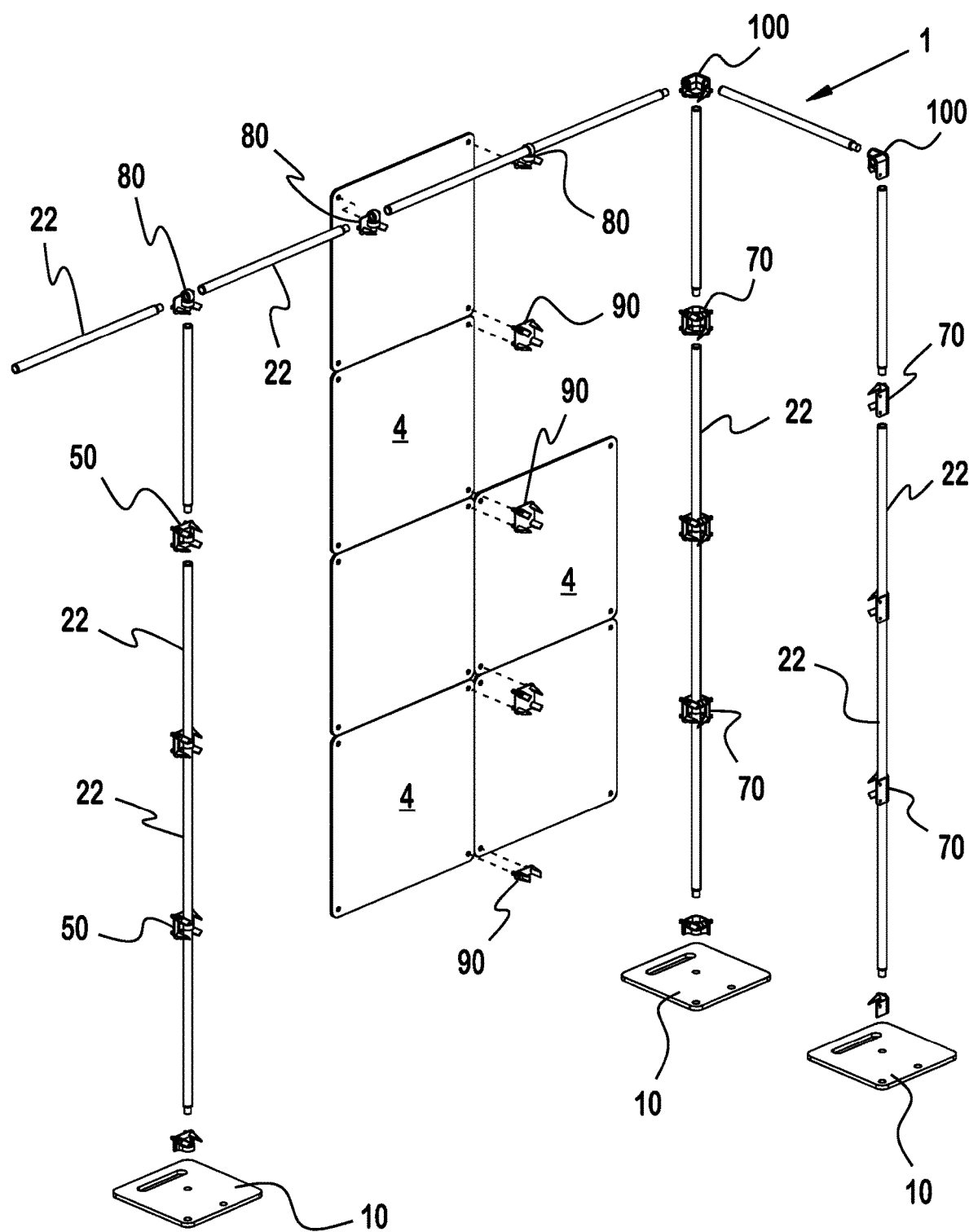
FIG. 2 is a rear exploded perspective view of the display system according to the invention.

Now with reference to FIG. 2, the collapsible support structure 20 is shown and includes plurality of support pieces 22.

Figure 4:
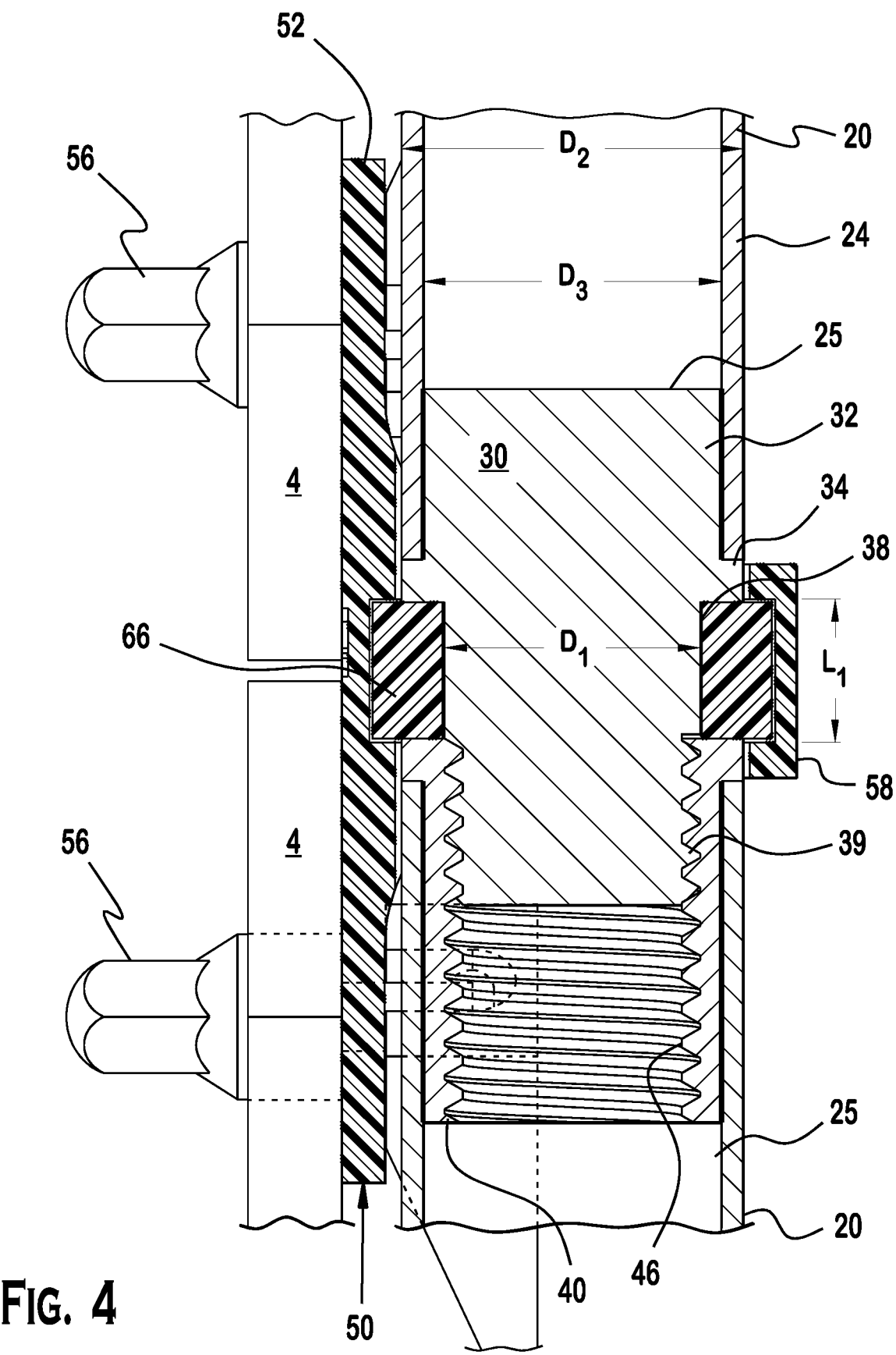
FIG. 4 is a sectional view of the display system according to the invention, taken along line 3-3 in FIG. 1.
Figure 5:
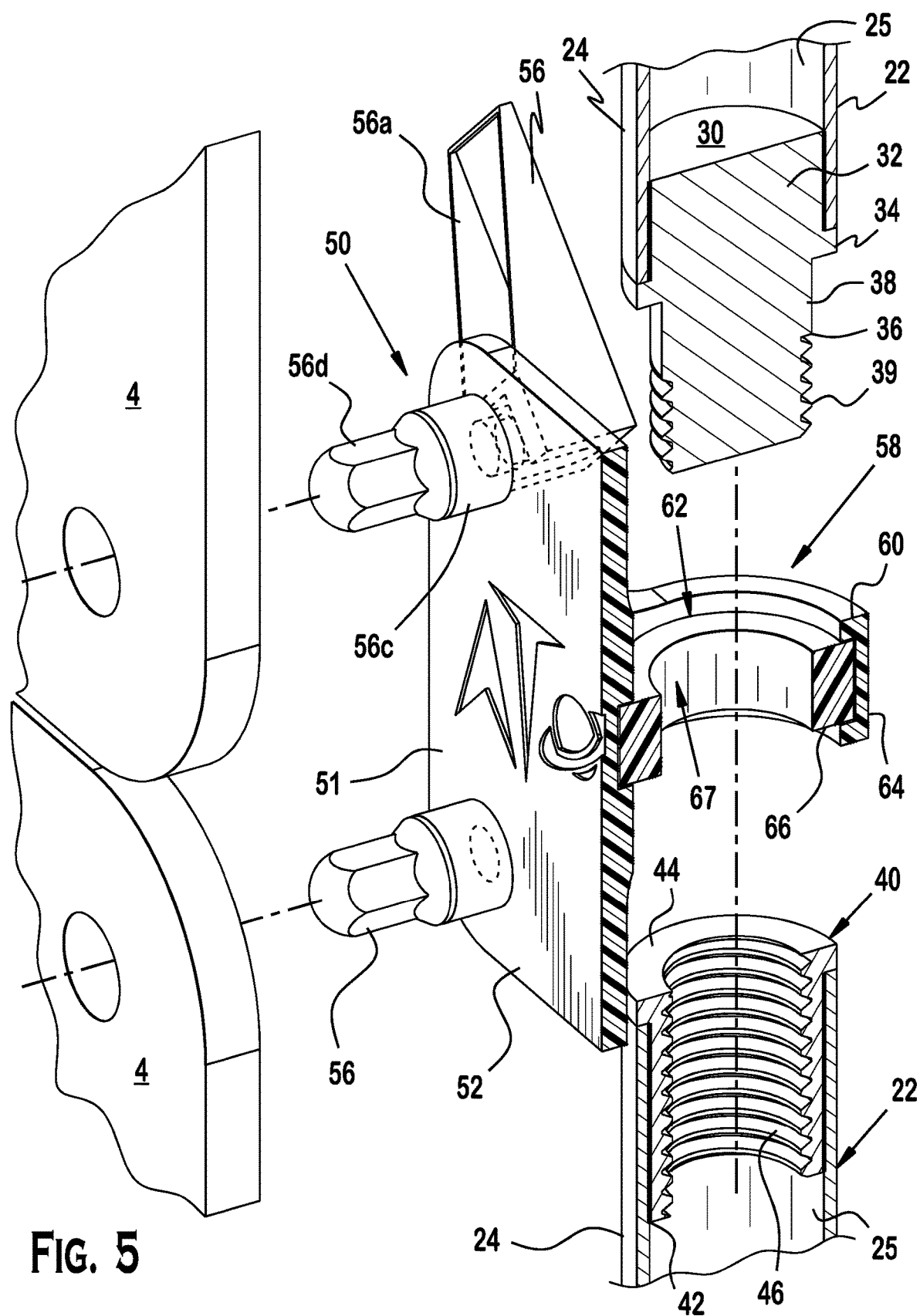
FIG. 5 is an exploded perspective view of the display system shown in FIG. 4.

As shown in FIGS. 4 and 5, each support piece 22 is an elongated rod-like member having a support body 24, a male section 30 disposed at one end of the support body 24, and a female section 40 disposed at an opposite end of the support body 24.

In the embodiment shown, each support piece 22 is prepared from a structural material, such as aluminum. However, the support piece 22 may be prepared from other structural materials, as was described with respect to the base 10 above.

Each support piece 22, in the embodiment shown, is cylindrical and has a common length with respect to the other shown support pieces 22. However, it is possible that support piece 22 has a rectangular or square cross section, or other polygonal shape. Furthermore, the plurality of support pieces 22 may have differing lengths, such that the collapsible support structure 20 includes shorter and longer support pieces 22, as well as angled support pieces (not shown).

In the shown embodiment, the support body 24 is a tubular member. As such, the support body 24 is hollow and includes an attachment receiving passageways 25 disposed at opposite distal ends thereof. The support body 24 includes internal walls having a uniform thickness, which prevents deformation of the support body. The internal walls are prepared thick enough to support the overall weight of the collapsible support structure 20 when assembled into the display system 1. However, it is possible, in other embodiments, that the support body 24 is a solid member having even greater rigidity.

If the support body 24 is solid, then the support body 24 may include a pair of attachment receiving passageways 25 disposed at opposite ends. The pair of attachment receiving passageways 25 would be prepared along opposite ends of the support body 24 and be design to correspond and receive the male section 30 and the female section 40, respectively.

As shown in FIGS. 4 and 5, the male section 30 includes a body connection section 32, a first support wall 34, and a fastener member 36. In the shown embodiment, the male section 30 extends from the support body 24 and, in particular, from a distal end of the support body 24 having a first attachment receiving passageway 25. In the embodiment shown, male section 30 is prepared from a structural material such as aluminum. However, it is possible that the male section 30 may be prepared from other structural materials, like the base 10 as was described above.

As shown in FIGS. 4 and 5, the first support wall 34 is a disk shaped member facing the first attachment receiving passageway 25. The first support wall 34 includes an external ridge extending outward to a major surface of the support body 24. The first support wall 34 includes a flat planar surface facing away from the support body 24 and is sized and shaped to correspond with the spinner connector 50 during assembly of the display system 1.

The body connection section 32 is a cylindrical section, extending from the first support wall 34 and protruding into the attachment receiving passageway 25. In particular, the body connection section 32 is sized to correspond with the attachment receiving passageway 25 of the support body 24.

In the shown embodiment, the fastener member 36 is an elongated member having a connector receiving section 38 and a fastener section 39. The fastener member 36 extends from the first support wall 34. However, in the alternative, the fastener member 36 may extend from the body connection section 32, or the support body 24. The fastener member 36 is a solid rod-like member, but could be hollow as desired. In the embodiment shown, the connector receiving section 38 extends from the first support wall 34 and into the fastener section 39. However, in other embodiments, one skilled in the art would appreciate that the fastener member 36 could extend from the body connection section 32 or the support body 24, depending on how the male section 30 secures to the support body 24. The connector receiving section 38 includes a smooth outer surface and has a cylindrical shape. In the embodiment shown, the connector receiving section 38 is cylindrical and includes a smaller cross sectional diameter than a cross sectional diameter of the support body 24.

In the shown embodiment, the connector receiving section 38 has a cross sectional distance d1, such as diameter or width depending on shape, which is smaller than a relative distance d2 of the support body 24. The distance d2 is measured between opposite outer surfaces of the support body 24 (i.e. diameter, width depending on the shape of the support body 24, respectively. As a result, the cross sectional distance d1 is smaller than a relative distance d3 of the attachment receiving passageway 25, which is measured the diameter or width of the attachment receiving passageway 25.

In the embodiment shown, the connector receiving section 38 has a smaller cross sectional diameter than a cross sectional diameter of the support body 24. However, it is possible that the connector receiving section 38 has a different cross sectional shape, as well as size than shown.

However, it is possible that the connector receiving section 38 has a different cross sectional shape, as well as size than those shown. For instance, the connector receiving section 38 may have other cross sectional shapes, such as square or rectangle.

In the embodiment shown, the fastener section 39 is positioned on a leading end of the fastener member 36 and includes an external threaded section disposed along an outer surface thereof. In other embodiments, the external threaded section may be replaced by a detent system, a snap fit system, a friction fit system, or other fastener systems known to one skilled in the art.

As shown in FIGS. 4 and 5, the female section 40 includes a body connection section 42, a second support wall 44, and a fastener mating section 46. In the shown embodiment, the female section 40 extends from the support body 24 and, in particular, from a distal end of the support body 24 having a second attachment receiving passageway 25. In the embodiment shown, female section 40 is prepared from a structural material such as aluminum. However, it is possible that the female section 40 may be prepared from other structural materials, like the male section 30 as described above.

The body connection section 42 is a hollow tubular member having a male section receiving passageway 43 positioned there through. The second support wall 44 is a disk shaped member facing the second attachment receiving passageway 25. The second support wall 44 includes an external ridge extending outward to a major surface of the support body 24. Furthermore, the second support wall 44 includes a flat planar surface facing away from the support body 24. In the embodiment shown, the second support wall 44 is a flange that extends outward from the body connection section 42. The second support wall 44 includes a flat planar surface that faces away from the support body 24.

The male section receiving passageway 43 is sized and shaped to receive the male section 30. In particular, the male section receiving passageway 45 sized and shaped to receive the fastener member 36.

The second support wall 44 is shaped to correspond with the shape and dimensions of an outer surface side of the support body 24. The second support wall 44 faces a second surface end of the support body 24 such that female section 40 rests against the support body 24. Furthermore, the second support wall 44 is sized and shaped to correspond with the spinner connector 50 during assembly of the display system 1.

As shown in FIGS. 4 and 5, the fastener mating section 46 is disposed along the male section receiving passageways 43 of the body connection section 42 and the second support wall 44, respectively. However, in another embodiment, it is possible that the fastener mating section 46 is disposed along an inner surface of the support body 24, without the need to the body connection section 42 and the second support wall 44.

As shown, the fastener mating section 46 includes a threaded section that is sized and shaped to mate with the female section 40. In particular, the fastener mating section 46 is a threaded through-hole designed to mate with the complementary external threaded section of the male section 30. The fastener mating section 46 includes an internal threaded section. However, in other embodiments, the fastener mating section 46 may include a detent system, a snap fit system, a friction fit system, or other known fastening systems.

Figure 12:
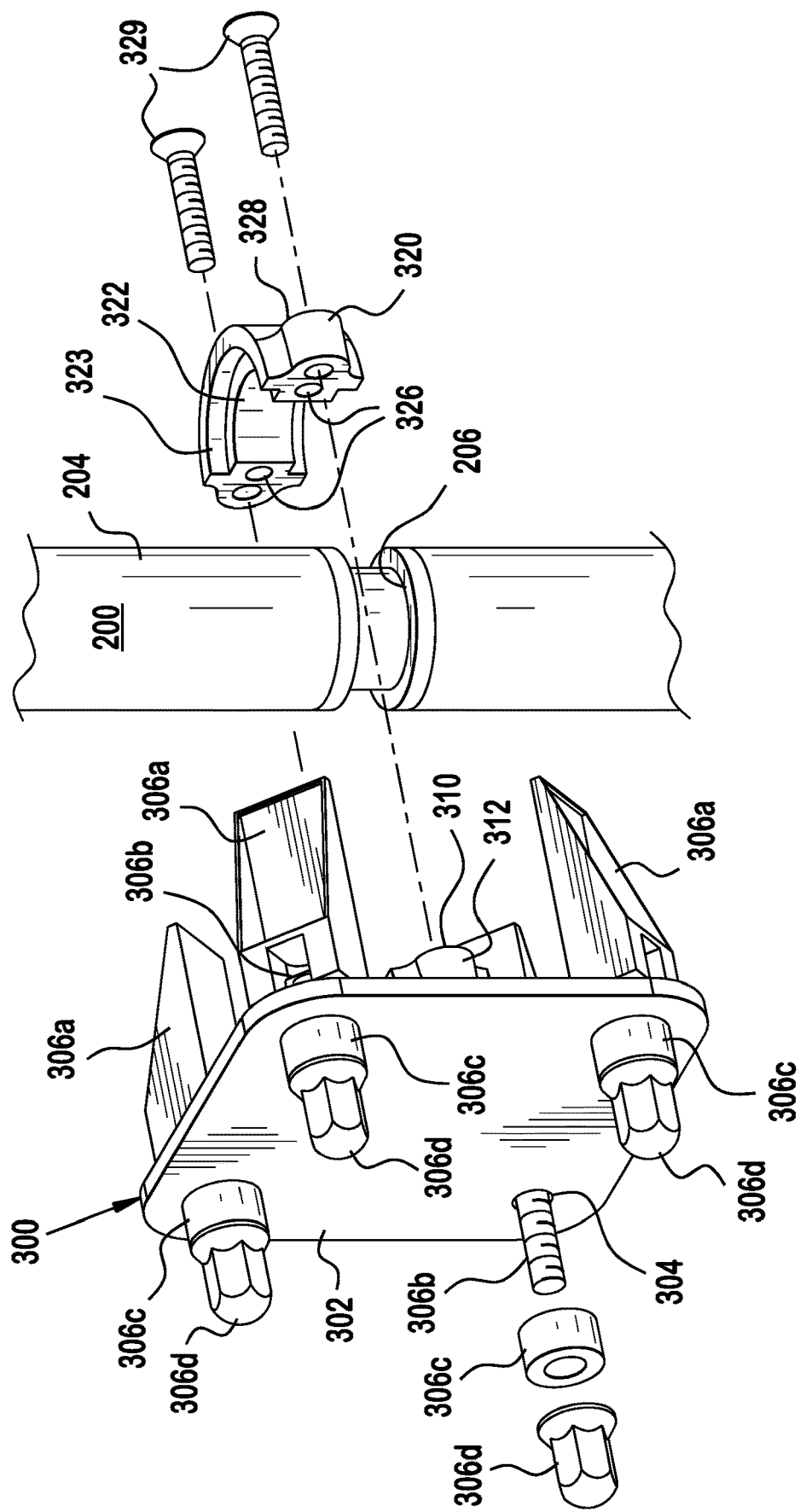
FIG. 12 is a front exploded perspective view of another spinner connector according to the invention.
Figure 13:
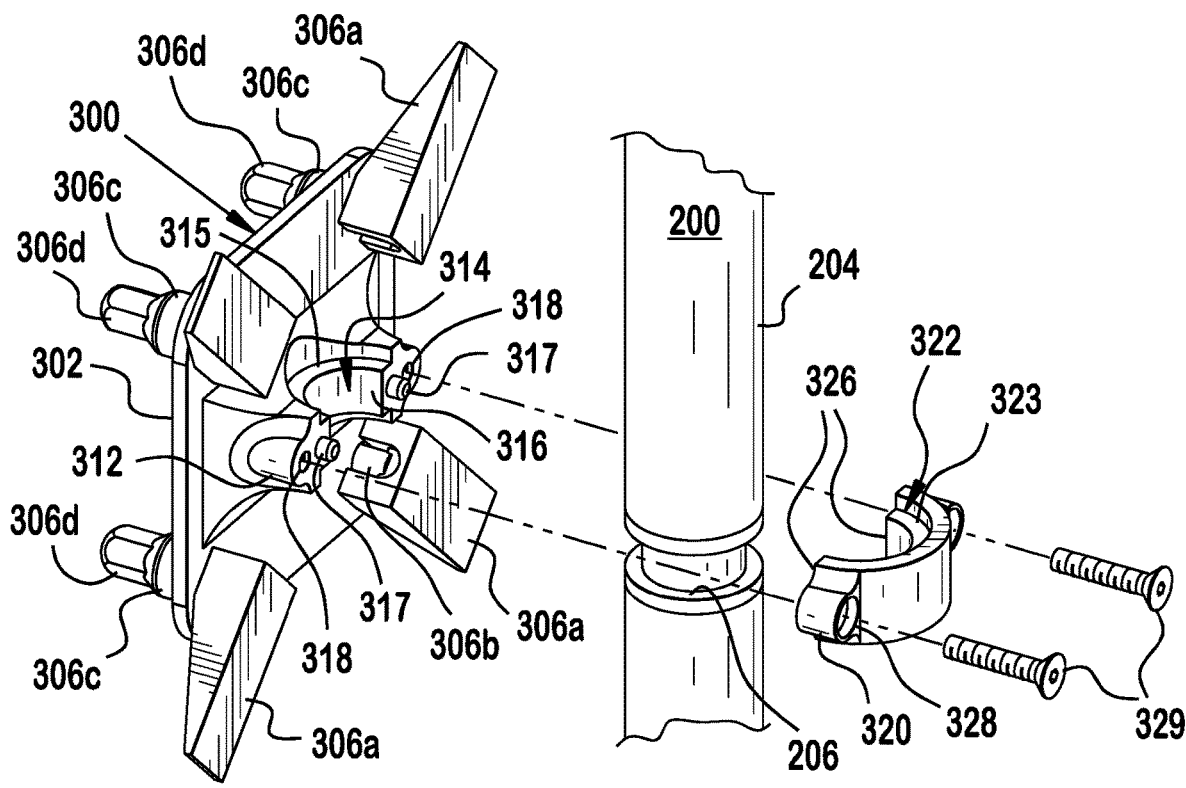
FIG. 13 is a rear perspective view of the spinner connector according of FIG. 12, shown unassembled.
Figure 14:
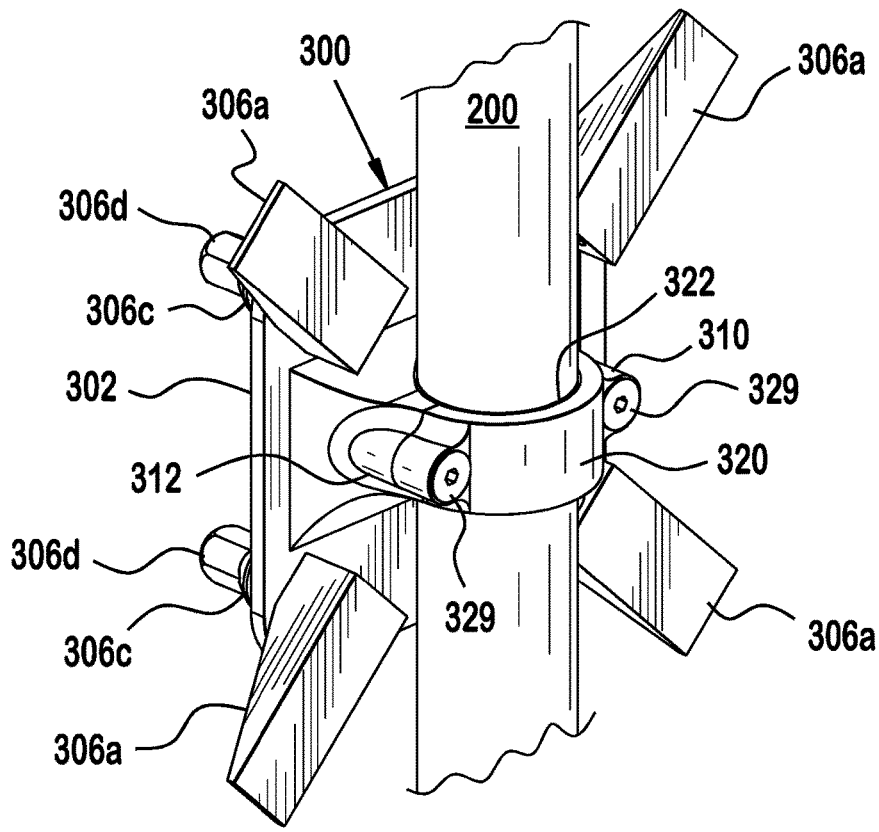
FIG. 14 is a rear perspective view of the spinner connector of FIG. 12, shown assembled.

In another embodiment, as shown in FIGS. 12-14, a support piece 200 is shown, and an elongated rod-like member having a support body 204, a first connection section (not shown) disposed at one end of the support body 204, a second connection section (not shown) disposed at an opposite end of the support body 204, and one or more spinner receiving sections 206 disposed along a surface of the support body 204.

In the embodiment shown, the support body 204 includes a smooth outer surface and has a cylindrical shape. In the embodiment shown, the spinner receiving section 206 is also cylindrical and includes a smaller cross sectional diameter than a cross sectional diameter of the support body 204. The spinner receiving section 206 is an integral design of the support body 204, such that it is a groove provided along a surface of the support body 204 and extending there into.

Like the support piece 22, each support piece 200 is prepared from a structural material, such as aluminum. However, the support piece 200 may be prepared from other structural materials, as was described with respect to the base 10 above.

Each support piece 200, in the embodiment shown, is cylindrical and may have a differing length than the shown support pieces 22. In fact, it is possible that support piece 200 has a rectangular or square cross section, or other polygonal shape. Furthermore, each support pieces 200 may have differing lengths, such that the collapsible support structure 20 includes one longer support piece 200, instead of connecting support pieces 22, as well as angled support pieces (not shown).

In the shown embodiment, the support piece 200 has a length such that the support piece 200 connects the base 10 to a top component piece of the display system 1. Therefore, multiple support pieces 200 may not be need to build the collapsible support structure 20 upward from the base 10 to a specific height. As a result, one or more spinner receiving sections 206 are manufactured to between the first and second connection sections (not shown).

In the shown embodiment, the support body 204 is a tubular member. However, it is possible, in other embodiments, that the support body 204 is a solid member having even greater rigidity.

The first connection section and second connection sections, disposed at opposite ends of the support body 204, may include a male section 30 or female section 40, as described above. However, the invention is not limited to this, and one skilled in the art should appreciate that first connection section could be any attachment means capable of attaching the support piece 200 to the base 10, and other system components. Since the support piece 200 does not need to connect directly to other support pieces 200, the support piece 200 includes one or more spinner receiving sections 206 along its surface to receive other component pieces, such as a spinner connector 300, which will be described below.

Figure 6:
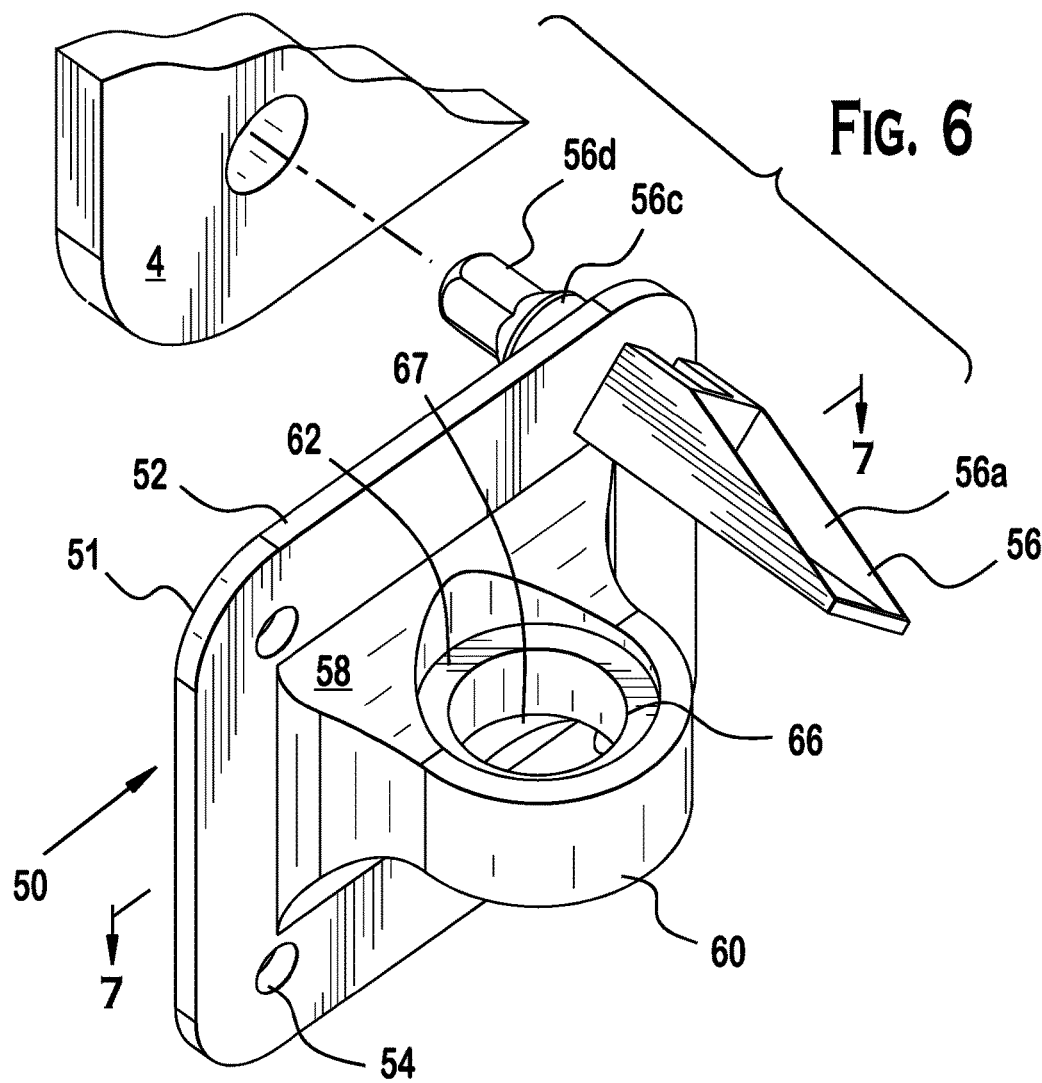
FIG. 6 is a rear perspective view of another spinner connector according to the invention.
Figure 7:
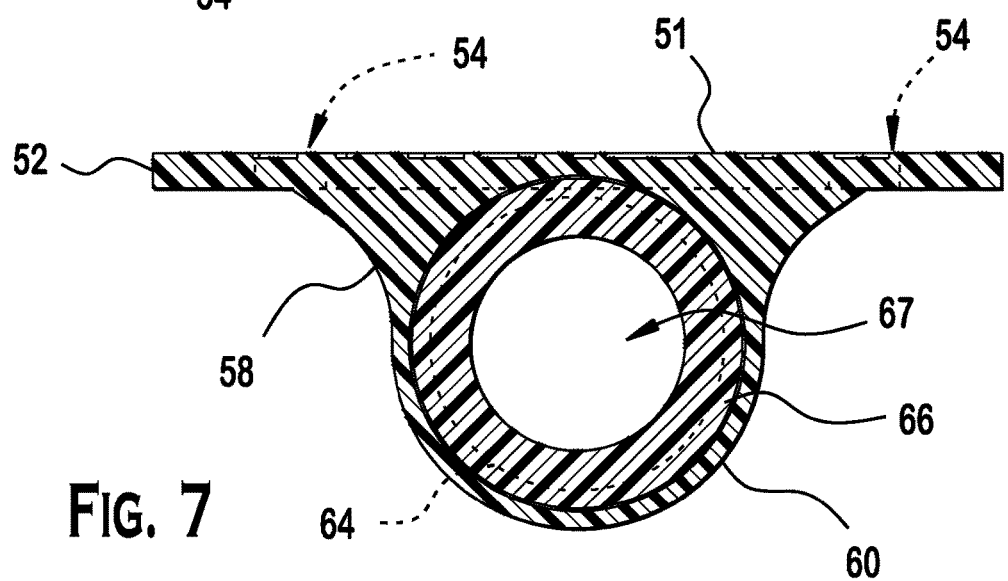
FIG. 7 is a sectional view of the spinner connector shown in FIG. 6, taken along line 5-5.

Now with reference to FIGS. 5-7, the spinner connector 50 includes a plate body 52 with a plurality of fastener receiving through holes 54, a plurality of fasteners 56, and a ring support section 58 on a rear surface side of the plate body 52.

In the shown embodiment, the spinner connector 50 is a plastic article, but could be prepared from other known materials available to one skilled in the art, including metals, fibrous material, or composites.

In the embodiment shown, the plate body 52 is a thin rigid planar member having a smooth flat front surface 51. The plurality of fastener receiving through holes 54 extend through the planar member. In particular, the fastener receiving through holes 54 are positioned adjacent to an outer edge of the plate body 52. In the embodiment shown, the plate body 52 is square, but could have polygonal shapes.

In an alternative embodiment, the plate body 52 may include panel receiving sections (not shown), which are indentations along the flat front surface meant to receive a section of the modular panel 4, for a more controlled fit of the modular panel 4 and the spinner connector 50.

As shown in FIGS. 4 and 5, each fastener 56 is a swell latch having a lever 56a attached to a screw 56b, a rubber washer 56c, and a nut 56d connectable with the screw 56b.

The screw 56b is sized and shaped to extend through fastener receiving through holes 54 and the plurality of fastener receiving passageways 6 of the modular panel 4. The rubber washer 56c is sized to fit within the plurality of fastener receiving passageways 6.

However, one skilled in the art would appreciate that the fastener 56, in other embodiments, may be any known type of fastener, such a latch, screw, nut and bolt, hook and loop fastener, and removable adhesive. Depending on the fastener 56 used, the fastener receiving through hole 54 may not be necessary. For instances, the modular panel 4 may include a removable adhesive that effectively attaches to the plate body 52 without the need of additional fasteners for the spinner connector 50.

As shown in FIGS. 5-7, the ring support section 58 is disposed along a rear side of the plate body 52 and extends way from the rear surface. In particular, the ring support section 58 includes an outer shell 60 and an inner ring 66 positioned in the outer shell 60, such that the inner ring 66 can independently move with respect to the outer shell 60. In the embodiment shown, the ring support section 58 is made from the same material as the plate body 52.

As shown in FIG. 5, the outer shell 60 is a separate component from the plate body 52. However, as shown in FIG. 6, the outer shell 60 may also be an integral component to the plate body 52, such that the outer shell 60 and the plate body 52 are a monolithic piece. In the shown embodiments, the outer shell 60 includes a support piece receiving passageway 62 and a ring receiving section 64.

The support piece receiving passageway 62 is a passageway extending through the outer shell 60 and is sized to receive the fastener member 36. The support piece receiving passageway 62 is circular. However, depending on the cross sectional shape of the support piece 22, the passageway may have another shape.

The ring receiving section 64 is a recess disposed along an inner surface of the support piece receiving passageway 62 and is sized to receive the inner ring 66. In the shown embodiment, the ring receiving section 64 is a long depression for receiving a corresponding ridge, and is disposed along an entirety of the inner surface of the support piece receiving passageway 62.

The ring receiving section 64 has a diameter that is larger than a cross sectional distance of the support piece receiving passageway 62. The inner surfaces of the ring receiving section 64 are smooth to promote free movement of the inner ring 66 when positioned therein.

The inner ring 66 includes is a disk shaped member having a through hole. In the embodiment shown, the inner ring 66 is a tubular member having a circular cross section. The inner ring 66 includes an inner support piece opening 67 and a pair of bearing walls 68 positioned on opposite major surfaces of the inner ring 66. The inner support piece opening 67 has a circular cross section, and each bearing wall 68 includes a planar smooth surface.

In the embodiment shown, the inner ring 66 is prepared from the same material as the plate body 52 and the outer shell 60, but could be prepared from a variety of materials.

The inner support piece opening 67 is sized and shaped to correspond with the connector receiving section 38, while the pair of bearing walls 68 includes a planar surface sized and corresponding with first support wall 34 and the second support wall 44, respectively.

In the alternative, the inner ring 66 can be any mechanism that provides for free linear movement of the plate body 52 around a fixed axis. For instance, the inner ring 66 could be a mechanical bearing that is insert molded or attached to the spinner connector 50. In another embodiment, the inner ring 66 could be rigidly securely to the outer shell 60 or an integral component of the outer shell 60.

Now with reference back to FIGS. 12-14, the spinner connector 300 for use with the support piece 200 includes a plate body 302 with a plurality of fastener receiving through holes 304, a plurality of fasteners 306, and a ring support section 310 on a rear surface side of the plate body 202.

In the shown embodiment, the spinner connector 300 is a plastic article, but could be prepared from other known materials available to one skilled in the art, including metals, fibrous material, or composites.

In the embodiment shown, the plate body 302 is a thin rigid planar member having a smooth flat front surface 301. The plurality of fastener receiving through holes 304 extend through the planar member. In particular, the fastener receiving through holes 304 are positioned adjacent to an outer edge of the plate body 302. In the embodiment shown, the plate body 302 is square, but could have polygonal shapes.

Each fastener 306 is a swell latch having a lever 306a attached to a screw 306b, a rubber washer 306c, and a nut 306d connectable with the screw 306b. The screw 306b is sized and shaped to extend through fastener receiving through holes 304 and the plurality of fastener receiving passageways 6 of the modular panel 4. The rubber washer 306c is sized to fit within the plurality of fastener receiving passageways 6.

However, one skilled in the art would appreciate that the fastener 306, in other embodiments, may be any known type of fastener, such a latch, screw, nut and bolt, hook and loop fastener, and removable adhesive. Depending on the fastener 306 used, the fastener receiving through hole 304 may not be necessary. For instances, the modular panel 4 may include a removable adhesive that effectively attaches to the plate body 302 without the need of additional fasteners for the spinner connector 300.

As shown in FIGS. 12-14, the ring support section 310 is disposed along a rear side of the plate body 302 and extends way from the rear surface. In particular, the ring support section 310 includes an inner shell 312 and an outer shell 320 positioned to connect with the inner shell 312, such that the inner shell 312 and the outer shell 320 correspond and attaches to form the ring support section 310. The ring support section 310 then would have similar design, shape and dimensions as the outer shell 60, describe with reference to the spinner connector 50. However, the ring support section 310 is capable to separates, such that inner shell 312 and outer shell 320 can connect around a system component, such as a support piece 200, and then reattach to each other.

In the embodiment shown, the ring support section 310 is made from the same material as the plate body 302.

The inner shell 312 includes an inner ring section 314, an outer shell connector 317, and a fastener receiving member 318.

The inner ring section 314 is stepped down from an outer surface of the inner shell 312 to include a first support piece receiving passageway 315 and a first ring receiving section 316.

The first support piece receiving passageway 315 is a recess extending through the inner shell 312 and includes an outer surface to receive a portion of the support body 204. In the shown embodiment, the first support piece receiving passageway 315 is circular. However, depending on the cross sectional shape of the support piece 200 the first support piece receiving passageway may have another shape.

The first ring receiving section 316 is a recess disposed along an inner surface of the first support piece receiving passageway 315 and is sized to receive a portion of the spinner receiving section 206. In the shown embodiment, the first ring receiving section 316 is an inner surface for receiving a surface side of the spinner receiving section 206, and is disposed along an entirety of the inner surface of the first support piece receiving passageway 315.

In the shown embodiment, the outer shell connector 317 is a pair of protruding members extending from end surfaces of the inner shell 312. The outer shell connector 317 is positioned to correspond with the outer shell 320.

In the embodiment shown, the fastener receiving member 318 are a pair of fastener receiving members. For example, a pair of threaded through holes may be manufactured one opposite sides of the inner shell 312 to receive and secure fasteners positioned there through, such as screws or bolts.

The outer shell 320 includes an outer ring 322, an inner shell connector 326, and a fastener receiving section 328.

The outer ring 322 is stepped down from an outer surface of the outer shell 320 to include a second support piece receiving passageway 323 and a second ring receiving section 324.

The second support piece receiving passageway 323 is a recess extending through the outer shell 320 and is sized to receive a remaining portion of the support body 204, with respect to the inner shell 312. In the shown embodiment, the second support piece receiving passageway 323 is circular. However, depending on the cross sectional shape of the support piece 200 the second support piece receiving passageway 323 may have another shape.

The second ring receiving section 324 is a recess disposed along an inner surface of the second support piece receiving passageway 323 and is sized to receive a remaining portion of the spinner receiving section 206, with respect to the inner shell 312. In the shown embodiment, the second ring receiving section 324 is a long surface for receiving a remaining surface side of the spinner receiving section 206 with respect to the inner shell 312, and is disposed along an entirety of the inner surface of the second support piece receiving passageway 323.

In the shown embodiment, the inner shell connector 326 is a pair of receiving passageways extending into an end surface of the outer shell 320 and corresponds to the outer shell connector 317. The inner shell connector 326 is positioned to correspond with the inner shell 312.

In the embodiment shown, the fastener receiving section 328 is a pair of fastener receiving through holes through which a pair of fasteners 329 extend there through and connect with the fastener receiving members 318 to secure the outer shell 320 to the inner shell 312.

Now with reference to FIGS. 8 and 9, spinner connectors 70, 80 are shown and include the component pieces of the spinner connector 50 described above. For the sake of brevity, only those features that differ from the spinner connector 50 will be discussed, while like components will be omitted.

As shown in FIG. 8, the spinner connector 70 includes an angled plate body 72. The angled plate body 72 includes multiple planar surfaces extending in different directions.

Each fastener 76 is a swell latch having a lever 76a attached to a screw 76b, a rubber washer 76c, and a nut 76d connectable with the screw 76b. The screw 76b is sized and shaped to extend through fastener receiving through holes (not shown) and the plurality of fastener receiving passageways 6 of the modular panel 4. The rubber washer 76c is sized to fit within the plurality of fastener receiving passageways 6.

As shown in FIG. 9, the spinner connector 80 includes a support connector 82, a plate body 83, and an outer shell 84. The plate body 83 and the outer shell 84 are components similar to the same named components described above, with reference to the spinner connector 50. In the shown embodiment, the support connector 82 is a fastener piece extending from the plate body 83 and the outer shell 84.

The support connector 82 includes a connector 86 extending from the plate body 83 and the outer shell 84 and an elongated member 88 extending from the connector 87. The connector 86 is a solid member integrally formed with the plate body 83 and the outer shell 84, while the elongated body 88 is a solid cylindrical member having an external threaded section disposed along an outer surface thereof.

In the shown embodiment, the external threaded section is sized and shaped to engage with the female section 40 and secure the spinner connector 50 with three or more support pieces 22. It may be possible to includes more than one support connector 82 to accommodate different angles between connecting support pieces 22.

Each fastener 89 is a swell latch having a lever 89a attached to a screw 89b, a rubber washer 89c, and a nut 89d connectable with the screw 89b. The screw 89b is sized and shaped to extend through fastener receiving through holes (not shown) and the plurality of fastener receiving passageways 6 of the modular panel 4. The rubber washer 89c is sized to fit within the plurality of fastener receiving passageways 6.

The display system 1 may include a plurality of other connectors, such as a plurality of supplemental connectors 90 and a plurality of structure connectors 100, which are used for display system 1 to promote better adjustability and customization.

With reference to FIG. 10, a supplemental connector 90 is shown and includes a similar to the spinner connector 50, except that the supplemental connector 90 does not include a ring support section 58 or an inner ring 66. Rather, as shown, the supplemental connector 90 includes a connector plate 92 having a plurality of fastener receiving through holes 94 and a plurality of fasteners 96 (i.e. swell action latch) positioned through the fastener receiving through holes 94 and attaching to a section of the modular panel 4. The connector plate 92 is a thin flat planar member in the embodiment shown, but could include multiple planar surfaces extending at a variety of angles.

In the embodiment shown, the fastener 96 is a swell latch having a lever 96a attached to a screw 96b, a rubber washer 96c, and a nut 96d connectable with the screw 96b. The fasteners 96 are sized and shaped as the fastener 56, as described above. As discussed above, the use of other fasteners is possible, including other latches, screws, nuts and bolts, Velcro, and removable adhesives.

Now with reference to FIG. 11, a structure connector 100 is shown and includes a connector plate 102 having a plurality of fastener receiving through holes 104, a plurality of fasteners 106 (i.e. swell action latch), and a plurality of support connectors 108. The connector plate 102 is a thin flat planar member in the embodiment shown, but could include multiple planar surfaces extending at a variety of angles. It is also possible, in other embodiments, that the structure connector 100 does not include the connector plate 102, but only includes a plurality of support connectors 108 attached together at different angles.

In the embodiment shown, each support connector 108 is a fastener piece extending from the connector plate 102. The support connector 108 includes a connector 109 extending from the connector plate 102 and an elongated member 110 extending from the connector 109. The connector 109 is a solid member having a support piece receiving section 114 extending there through. The elongated member 110 is a solid cylindrical member having an external threaded section 112 disposed along an outer surface thereof.

In the embodiment shown, the elongated member 110 is sized to receive the female section 40 of the support piece 22. In another embodiment, the support connector 108 is sized and shaped to correspond with the male section 30 of the support piece 22.

In the alternative, as shown, the support connector 108 may include an internal threaded section 116 disposed along an inner surface of support piece receiving section 114, without the elongated member 110. Different combinations of support connectors 108 are possible, as shown.

As shown in FIG. 11, each fastener 106 is a swell latch having a lever 106a attached to a screw 106b, a rubber washer 106c, and a nut 106d connectable with the screw 106b. The fastener 106 is sized and shaped as described above, with reference to fasteners 56, 96. However, other fasteners are possible, including other latches, screws, nuts and bolts, Velcro, and removable adhesives. Each fastener 106 is a fastener designed to securely connect the structure connector 100 to the modular panel 4. Depending on the fastener 106 used, the fastener receiving through hole 104 may not be necessary. For instances, the modular panel 4 may include a removable adhesive that effectively attaches to the connector plate 102 without the need of additional fasteners 106 for the structure connector 100.

Now with reference to the drawings, assembly of the major components for the display system 1 will be discussed.

As shown in FIGS. 1 and 2, the support pieces 22 are shown and connected to each other to form the collapsible support structure 20 for the display system 1. Connection of the support pieces 22 will now be described in further detail.

As shown in FIGS. 4 and 5, the male section 30 is secured at one end of the support body 24, while the female section 40 is secured at an opposite end of the support body 24.

The body connection section 32 is received by and then secured to the support body 24. The body connection section 32 is fitted within the attachment receiving passageway 25, and then is secured to an inner surface of the support piece 22 using an adhesive or mechanical joint. In the embodiment shown, the male section 30 is secured to the support body 24 using a material joint and, in particular, the body connection section 32 is welded to the support body 24 along the attachment receiving passageway 25. However, it is also possible that additional fasteners, joints, and adhesives are used. Additionally, it is possible to secure the male section 30 with support body 24 along various locations, for instance, a connection may be formed between the support body 24 and the first support wall 34 (i.e. using a joint or an adhesive).

As shown in FIGS. 4 and 5, the first support wall 34 connects to the body connection section 32. The external ridge of the of the first support wall 34, in the shown embodiment, corresponds to the shape and dimensions of an outer surface side of the support body 24. As a result, a cross section of the body connection section 32 matches a cross section of the support body 24, such that there is flush outer surface.

The first support wall 34 abuts the support body 24 such that male section 30 rests against the support body 24.

In the shown embodiment, the first support wall 34 cleanly secures male section 30 to the support body 24, while also preventing the male section 30 from being further moved into the attachment receiving passageway 25. In another embodiment, the first support wall 34 directly secures to the support body 24 using an adhesive or material joint, such as a weld, without the use of the body connection section 32. In yet another embodiment, the first support wall 34 may be a surface end of the support body 24, and the male section 30 attaches to the support body 24 using the body connection section 32 or other technologies or available to one skilled in the art, including fasteners, adhesives, or manufacturing techniques.

As shown in FIGS. 4 and 5, the female section 40 is secured at an opposite end of the support body 24. The support body 24 receives the body connection section 42, which is then rigidly secured to the support body 24. The second support wall 44 which is shaped to correspond with the shape and dimensions of an outer surface side of the support body 24, faces a second surface end of the support body 24 such that female section 40 rests against the support body 24.

In the shown embodiment, the second support wall 44 is secured to the support body 24. A cross section of second support wall 44 matches the outer surface sides of the support body 24 and includes a flat planar surface. The second support wall 44 may directly attach to the support body 24 using an adhesive or material joint, such as a weld, without the use of the body connection section 42. Additionally, the second support wall 44 may be a surface end of the support body 24, and the female section 40 may attach to the support body 24 using known technologies available to one skilled in the art, including fasteners, adhesives, or manufacturing techniques.

In the shown embodiment, the female section 40 and, more particularly, the body connection section 42 is secured to the support body 24 using an adhesive or a mechanical joint. In particular, the body connection section 42 may welded to the support body 24. However, it is also possible that female section 40 attaches to the support body 24 using additional welds and adhesives along the support body 24. For instance, the female section 40 may be secured to the support body 24 using known techniques available to one skilled in the art, including a weld between the support body 24 and the second support wall 44.

In another embodiment, it is possible that the male section 30 and the female section 40 are integrally formed with the support body 24 using known or available manufacturing techniques, such as molding, machining, three-dimensional (3D) printing, or other known or available technologies.

Now with reference to FIGS. 5-7, assembly of the spinner connector 50 is discussed. The plate body 52 is secured to the ring support section 58 on a rear surface side of the plate body 52.

As shown in FIGS. 5-7, the inner ring 66 positioned in the outer shell 60, such that the inner ring 66 can independently move with respect to the outer shell 60.

As shown in FIG. 5, the outer shell 60 is a separate component from the plate body 52 and attaches to the plate body 52 along the rear surface thereof using an adhesive or material joint. However, other known attachment techniques are possible. As shown in FIG. 6, the outer shell 60 may also be an integral component to the plate body 52, such that the outer shell 60 and the plate body 52 are a monolithic piece.

The support piece receiving passageway 62 extends through the outer shell 60. However, depending on the cross sectional shape of the support piece 22, the passageway may have another shape.

The inner ring 66 fits inside the ring receiving section 64 since it is sized such that an outer edge of the inner ring 66 completely fits within the ring receiving section 64. A lubricant may be added between the inner ring 66 and the ring receiving section 64.

As shown in FIGS. 12-14, the ring support section 310 is integrally connected to the rear surface of the plate body 304, and extends substantially orthogonal and away from the plate body 304. In the shown embodiment, the inner shell 312 is attached to the plate body and the outer shell 320 is removably connected to the inner shell using the fasteners, such as screws 329 positioned through the outer shell 320 and connecting with the inner shell 312. The inner shell 312 and the outer shell 320 correspond and attach to form the ring support section 310. The ring support section 310 then would have similar design, shape and dimensions as the outer shell 60, describe with reference to the spinner connector 50. However, the ring support section 310 is capable to separates, such that inner shell 312 and outer shell 320 can connect around a system component, such as a support piece 200, and then reattach to each other.

The outer shell connector 317, which includes the pair of protruding members extending from end surfaces of the inner shell 312, is positioned to correspond with the outer shell 320. In particular, the outer shell 317 corresponds with the pair of receiving passageways extending into end surfaces of the outer shell 320.

Additionally, the fastener receiving member 318 correspond in placement with the fastener receiving sections 328 and are shaped to receive and secure a fastener 329.

The inner ring section 314 is shaped and sized to correspond with the outer ring 322, while the outer shell connector 317 is sized and shaped to correspond with the inner shell connector 326 such that the ring support section 310 is similar in shape and design as the outer shell 60 and the inner ring 66 described with reference to the spinner connector 50. However, in the shown embodiment, the ring support section 310 can be separated into two connecting components and the outer shell connector 317 is integral with the inner ring section 314 and the inner shell connector 326 is integral with the outer ring 322.

Now with reference to FIG. 8, the spinner connector 70 includes the angled plate body 72 where multiple planar surfaces are joined to form one or more corners. The spinner connector 70 in the shown embodiment is intended to connect two modular panels 4 at 90 degrees along a corner of the display assembly. However, the angled plate body 72 can be design to accommodate a variety of angles, such as long as the connection between the spinner connector 70 and the collapsible support structure 20 is not compromised. In the embodiment shown, the corner section is rounded, but could have a variety of shapes, including a 90 degree connection point.

Now with reference to FIG. 9, the support connector 82 is integrally formed with the plate body 83 and the outer shell 84, such that the spinner connector 80 extends between the plate body 83 and the ring support section 58. However, it is possible in other embodiments, the that support connector 82 is a separate component that is rigidly secured to the plate body and/or the outer shell 84 using an adhesive, fastener, or material joint, such as a weld.

Now, with reference to FIGS. 2-5, an assembly of use for the shown display system 1 will be described.

In general, as shown in FIG. 2, the display system 1 is assembled such that a plurality of modular panels 4 are displayable on the collapsible structure 20, as a setting or background for a scene, event or situation.

In general, a plurality of bases 10 support the collapsible support structure 20, while a plurality of spinner connectors 50 connect with the plurality of spinner connectors 50 that fasten to the plurality of modular panels 4. As a result, each modular panel 4 is independent of the collapsible support structure 20 and attaches in the display system 1 through the spinner connector 50 that independently moves with respect to the connecting collapsible support structure 20.

As shown in FIG. 2, a user positions a base 10 on a support surface 2, such as a floor. The distance between adjacent bases 10 will depend on the overall dimensions and shape of the display system 1, as designed for a particular purpose. The user would grip the grip 16 and position the support connection section 14 away from the support surface 2.

As shown in FIG. 2, the base 10 is positioned on the support surface 2, and the collapsible support structure 20 is assembled upward from the base 10. In particular, the support connection section 14 securely connects with the collapsible support structure 20. In the shown embodiment, the support connection section 14 includes an internal threaded section along an inner surface of the support connection section 14 to engage a corresponding threaded section of the support piece 22.

As shown in FIG. 3, the base body 12 may include a plurality of support connection sections 14. However, the number and design of the support connection section 14 may vary. The base 10 may include one or more support connection sections 14 and, in particular, include a variety the support connection sections 14 having keyed openings/passageways and protrusions.

The male section 30 or the female section 40 of support piece 22 engages the support connection section 14 depending on the design of the support connection section 14. However, in the embodiment shown, the male section 30 is screwed into the support connection section 14, using corresponding fasteners, in order securely connect the support piece 22 to the base 10.

As shown, the spinner connector 50 may be positioned between the support body 24 and the support connection section 14, such that the spinner connector 50 receives the male section 30. The support body 24 corresponds with support piece receiving passageway 62 and the connector receiving section 38 corresponds with inner support piece opening 67. The fastener member 36 extends downward through the spinner connector 50 and secure to fasteners disposed along the support connection section 14, while the first support wall 34 faces the inner ring 66. As the support piece 22 is tightened, the inner ring 66 receives the connector receiving section 38 and the first support wall 34 is received into the support piece receiving passageway 62 and abuts one of the pair of bearing walls 68. As a result, the support piece 22 is secured to the base 10 and the spinner connector 50 is positioned there between, such that the plate body 52 can freely spin about the inner ring 66 and the male section 30.

Now back with reference to FIG. 2, a plurality of support pieces 22 may be connected together, upward from the base 10. As shown, a second support piece 22 may connect to the female section 40 of the base connected support piece 22. In fact, any number of support pieces 22 may be used to build up the collapsible support structure 20. However, the number of support pieces 22 used will depend on the intended size of the overall display system 1.

The support pieces 22 connect together by engaging the male section 30 of one support piece 22 with the female section 40 of another support piece 22. As discussed above, different sized support pieces 22 may be available in order to customize the dimensions of the collapsible support structure 20.

As shown in FIGS. 2 and 9, each support piece 22 can also connect to the spinner connector 80 and, in particular, to the support connectors 82 that have a corresponding component to the male section 30 or the female section 40 of connecting support piece 22. In the shown embodiment, the spinner connector 80 can be used along a top section of the collapsible support structure 20 to connect support pieces 22 extending upward from the base 10.

As shown in FIGS. 2 and 11, each support piece 22 can also connect to the structure connector 100 and, in particular, to the support connectors 108 that have corresponding components to the male section 30 and the female section 40 of connecting support pieces 22. In the shown embodiment, the structure connector 100 can be used along corner sections of the collapsible support structure 20 to connect three support pieces 22 orthogonal to each other.

As shown in FIGS. 2 and 4, the spinner connector 50 can be positioned between adjoin support pieces 22 such that adjoining support pieces 22 engage the inner ring 66 and the plate body 52 is free to spin about a longitudinal axis of the adjoining support pieces 22.

The inner ring 66 connects to the support pieces 22 of the collapsible support structure 20. Since the inner ring 66 is an independent component of the plate body 52, and free to spin within the ring receiving section 64, the inner ring 66 promotes free rotation of the plate body 52 about a longitudinal axis extending through the support piece receiving passageway 62, the ring receiving section 64, and the inner ring 66.

As shown in FIGS. 4 and 5, the male section 30 of one support piece 22 extends through the outer shell 60 and inner ring 66 of the spinner connector 50 to engage with the female section 40 of another adjoining support piece 22. Both the connector receiving section 38 and the fastener section 39 extend through the inner ring 66. The fastener section 39 engages fastener mating section 46 of the female section 40. The fastener mating section 46 completely receives the fastener member 36, such that the second support wall 44 abuts the connector receiving section 38 in order to prevent over tightening the adjoining support pieces 22 and abuts an inner surface of the inner support piece opening 67 of the inner ring 66. Additionally, when the male section 30 and the female section 40 of the adjoining support pieces 22 are secured to another, the first support wall 34 of the male section 30 extends into the support piece receiving passageway 62 and abuts bearing wall 68 of the inner ring 66. The second support wall 44 also extends into the support piece receiving passageway 62 and abuts the bearing wall 68 of the inner ring 66 along an opposite surface thereof. The inner ring 66, which is positioned in the ring receiving section 64 of the outer shell 60, is supports both the first support wall 34 and the second support wall 44. In the embodiment shown, the inner ring 66 can independently spin within the outer shell 60, so the plate body 52 can independently move about adjoined support pieces 22.

The use of the spinner connector 50 provides mobility of connecting modular panels 4, such that the modular panel 4 can spin about adjoined support pieces 22 of the collapsible support structure 20.

As shown in FIGS. 2 and 4, each modular panel 4 connects to the spinner connector 50 using the fasteners 56. In the embodiment shown, the screw 56b passes through of one of the plurality of through holes 54 and the rubber washer 56c, and then engages with the nut 56d. The lever 56a is positioned opened (i.e. parallel to the screw 56b) and then used to tighten the screw 56b and the nut 56d together, which compresses the rubber washer 56c there between. The modular panel 4 is then pressed against a surface of the plate body 52, with the rubber washer 56c and nut 56d passing through the fastener receiving passageways 6. The rubber washer 56c is sized to fit in the fastener receiving passageways 6. When the rubber washer 56c is compressed tightly by the lever 56a in a closed position (i.e. perpendicular to the screw 56b), the rubber washer 56c extends radially outward, gripping the fastener receiving passageways 6 and securing the modular panel 4 against the plate body 52.

This can be performed as many times as necessary to prepare the modular panels 4 according to a desired arrangement. The spinner connector 80 may be used in the same way that the spinner connector 50 is described above.

Additionally, the modular panels 4 may be secured to the supplemental connectors 90, when a spinner connector 50 is not needed. The modular panel 4 would connect to the supplement connector 90 in a similar way as described above, with the use of the connector plate 92, the through holes 94, and the fasteners 96.

As shown in FIG. 10, the supplemental connector 90 is independent to the collapsible support structure 20. The connector plate 92 adjustably connects to the modular panel 4 since the connector plate 92 only connects to one section of each modular panel 4 and the supplemental connector 90 does not connect to the collapsible support structure 20. As a result, the modular panel 4 is capable of free range of motion being, and can rotate about a point of contact with the supplemental connector 90. The fastener 96 is a swell latch that attaches to the modular panel 4 as described above with reference to the fastener 56.

With reference to FIG. 11, the structure connector 100 is used to connect adjacent support pieces 22 of the collapsible support structure 20 without the use of the ring support section 58 or the inner ring 66. The fastener 106 is a swell latch that attaches to the modular panel 4 as described above with reference to the fastener 56.

In an alternative, as shown in FIGS. 12-14, the ring support section 310 may be used to quickly attach to already connected support pieces 22 or a single support piece 200. The inner shell 312 is positioned around one side of the connector receiving section 38 or the spinner receiving sections 206, depending on the type of support piece used. Furthermore, the outer shell 320 is then positioned around another side of the connector receiving section 38 or the spinner receiving sections 206. The inner shell 312 and outer shell 320 correspond and attach to each other to form the ring support section 310, which wholly wraps around the connector receiving section 38 or the spinner receiving sections 206, shown embodiments. Again, the ring support section 310 then would have similar design, shape and dimensions as the outer shell 60, describe with reference to the spinner connector 50. However, the ring support section 310 is capable to separates, such that inner shell 312 and outer shell 320 can connect around a system component, such as a support piece 200, and then reattach to each other.

In other embodiments, the above-described features could be used for a hanging display having beam prepared from a collapsible support structure 20, a plurality of modular panels 4, a plurality of spinner connectors 50, and a plurality of supplemental connectors 90.

The foregoing illustrates some of the possibilities for practicing the invention. Many other embodiments are possible within the scope and spirit of the invention. The disclosed invention utilizes the above identified components, as a system, in order to more efficiently construct a display system 1 for a particular purpose. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A building unit, comprising:
   a plurality of modular display panels positioned adjacent to each other in a grid shape array and extending between a display support structure having a plurality of interconnecting poles; and
   a plurality of modular display panel connectors not in contact with the display support structure and connecting the plurality of modular display panels from a rear planar surface side of the plurality of modular display panels, each modular display panel connector positioned along, and abutting the rear planar surface side of the plurality of modular display panels and having a connector plate and a plurality of press-fit fasteners each passing through the connector plate and one of the plurality of modular display panels, thereby securing the plurality of modular display panels in the grid shape array.

2. The building unit of claim 1, wherein each modular display panel comprises a panel body with a front surface displayed outward from said display support structure, and a plurality of fastener receiving passageways extending through the front surface of the panel body, wherein each of said plurality of fasteners are configured to pass through at least one of said fastener receiving passageways.

3. The building unit of claim 2, wherein said plurality of fasteners comprise a press-fit fastener positioned through said fastener receiving passageways.

4. The building unit of claim 3, wherein said press-fit fastener comprises a lever and a rubber washer expandable by a movement of the lever.

5. The building unit of claim 4, wherein said press-fit fastener further comprises a shaft connected to the lever, and having a cap at an opposite end than the lever, and extending through said modular display panel connector and said rubber washer.

6. The building unit of claim 5, wherein said shaft is threaded over at least a portion of its length.

7. The building unit of claim 6, wherein said cap is a nut configured to be threaded onto said threaded portion of said shaft.

8. The building unit of claim 7, wherein the rubber washer is configured to be smaller than the plurality of fastener receiving passageways until said rubber washer is expanded by movement of said lever, whereupon said expanded rubber washer is caused to be secured in said fastener receiving passageway.

9. The building unit of claim 1, further comprising a plurality of spinner connectors configured to be received upon said display support structure in a manner that allows independent rotation of said spinner connector about a longitudinal axis of at least a first of said interconnecting poles of said display support structure.

10. The building unit of claim 9, wherein said panels are removably connected to at least one spinner connector by at least one press-fit fastener, such that each modular panel is capable of movement independent of the display support structure.

11. The building unit of claim 10, wherein each spinner connector comprises a plate body and a ring support section having an outer shell disposed along a rear side of the plate body and an inner ring positioned in the outer shell and independently movable within the outer shell and configured to receive the display support structure.

12. The building unit of claim 11, wherein said plate body of each of said spinner connector is one of: a plate body arranged along a single plane, or a plate body having multiple planar surfaces joined at different angles to form a corner.

13. The building unit of claim 12, wherein said spinner connector further comprises a support connector extending from the plate body or ring support section.

14. The building unit of claim 13, wherein said support connector is configured to engage at least a second interconnecting pole at an angle that is orthogonal to said longitudinal axis of said first interconnecting pole.

15. The building unit of claim 13, wherein said support connector comprises at least one support connection section comprising a fastener system having elements selected from the group consisting of threaded elements, detent elements, snap-fit elements, or friction fit elements, such that said support connection system may be fastened to said display support structure.

16. The building unit of claim 1, wherein said interconnecting poles comprise a first end and a second end, and further comprise at least one support connection section comprising a connection system having elements selected from the group consisting of threaded elements, detent elements, snap-fit elements, or friction fit elements, such that any first end may be fastened to any second end of a different interconnecting pole.

17. The building unit of claim 16, wherein the at least one support connection system comprises threaded elements, said threaded elements comprise an external threaded end section on at least a first interconnecting pole, and an internal threaded end section on at least a second interconnecting pole, wherein said first and second interconnecting poles may be secured together by engaging the external threaded section with the internal threaded section.

18. The floor display of claim 17, wherein said interconnecting poles each have said external threaded section on a first end, and said internal threaded section on a second end, such that said interconnecting poles may be secured together using the threaded elements to form a display support structure having at least three interconnecting poles.

19. The building unit of claim 1, further comprising at least one base, wherein said display support structure is connectable with said base and supported and extending away from said base.

20. The building unit of claim 1, wherein the plurality of modular display panel connectors are unsupported by the display support structure.

* * * * *